United States Patent
Svenonius

(10) Patent No.: US 8,908,954 B2
(45) Date of Patent: Dec. 9, 2014

(54) REDUCTION OF NOISE CAUSED BY ABSORPTION OF X-RAY PHOTONS IN PIXELATED IMAGE SENSORS

(75) Inventor: Olof Svenonius, Djursholm (SE)

(73) Assignee: Scint-X AB, Kista (SE)

(*) Notice: Subject to any disclaimer, the term of this patent is extended or adjusted under 35 U.S.C. 154(b) by 559 days.

(21) Appl. No.: 13/381,717

(22) PCT Filed: Jun. 8, 2010

(86) PCT No.: PCT/SE2010/050634
§ 371 (c)(1),
(2), (4) Date: Dec. 30, 2011

(87) PCT Pub. No.: WO2011/002391
PCT Pub. Date: Jan. 6, 2011

(65) Prior Publication Data
US 2012/0126130 A1 May 24, 2012

Related U.S. Application Data

(60) Provisional application No. 61/222,620, filed on Jul. 2, 2009.

(51) Int. Cl.
*G06K 9/00* (2006.01)
*H04N 5/325* (2006.01)
*G06T 5/00* (2006.01)
*G06T 5/20* (2006.01)
*H04N 5/367* (2011.01)

(52) U.S. Cl.
CPC ............ *H04N 5/325* (2013.01); *G06T 5/002* (2013.01); *G06T 5/20* (2013.01); *H04N 5/3675* (2013.01); *G06T 2207/10116* (2013.01)
USPC ........... 382/132; 382/128; 382/260; 382/274; 250/370.11

(58) Field of Classification Search
CPC .... A61B 6/4224; A61B 6/4488; A61B 6/505; H04N 5/32; H04N 5/2253
USPC ............. 382/128, 132, 260, 274, 582, 581; 382/370.11, 370.09, 370.8, 366, 369, 51; 250/455, 582, 581, 370.11, 370.09, 250/370.8, 366, 369; 378/36, 51
See application file for complete search history.

(56) References Cited

U.S. PATENT DOCUMENTS

| | | | |
|---|---|---|---|
| 5,809,105 A | 9/1998 | Roehm et al. | |
| 6,069,935 A | 5/2000 | Schick et al. | |

(Continued)

FOREIGN PATENT DOCUMENTS

| | | | |
|---|---|---|---|
| EP | 0735747 A1 | 10/1996 | |
| GB | 2360684 A | 9/2001 | |

OTHER PUBLICATIONS

Chen H-C et al.: "Efficient impulse noise reduction via local directional gradients and fuzzy logic" Fuzzy Sets and Systems, Jul. 1, 2009, vol. 160, No. 13, pp. 1841-1857.
Dallas W J et al.: "Hit-noise reduction in portal images: a 1comparison between wavelet and rank-order based methods", SPIE, vol. 3034, p. 200-205.

(Continued)

*Primary Examiner* — Ali Bayat
(74) *Attorney, Agent, or Firm* — Young & Thompson

(57) ABSTRACT

There is provided a method and corresponding device for noise generated by absorption of x-ray photons in an image sensor having a number of pixels. The method is based on identifying (S1) so-called hot pixels affected by absorption of x-rays, and calculating (S2), for each hot pixel, directional gradients in a number of different directions in a pixel neighborhood of the hot pixel. The method further involves selecting (S3), for each hot pixel, at least one direction among those directions having lowest gradient, and determining (S4), for each hot pixel, a replacement value based on neighborhood pixel values in the selected direction(s). For each hot pixel, the value of the hot pixel is then replaced (S5) with the determined replacement value. In this way, noise generated by the absorption of x-ray photons in the image sensor may be reduced, while substantially maintaining the resolution (sharpness) in the image.

15 Claims, 10 Drawing Sheets

(56) References Cited

U.S. PATENT DOCUMENTS

| | | |
|---|---|---|
| 6,497,511 B1 | 12/2002 | Schmitt et al. |
| 7,068,854 B1 | 6/2006 | Aufrichtig et al. |
| 7,352,840 B1 | 4/2008 | Nagarkar et al. |
| 7,897,931 B2 * | 3/2011 | De Godzinsky ......... 250/370.09 |
| 8,120,683 B1 * | 2/2012 | Tumer et al. .................. 348/295 |
| 2002/0117613 A1 * | 8/2002 | Aufrichtig et al. ......... 250/252.1 |
| 2006/0054835 A1 * | 3/2006 | Rowlands et al. ............ 250/371 |
| 2007/0176109 A1 * | 8/2007 | Bell ........................ 250/370.09 |

OTHER PUBLICATIONS

Archambault L et al.: "Transient noise characterization and filtration in CCD cameras exposed to stray radiation from a medical linear accelerator", Medical Physics, Sep. 10, 2008, vol. 35, No. 10, pp. 4342-4351.

Zhou Y et al.: "Adaptive Fuzzy Median Filter for Images Corrupted by Impulse Noise", Image and Signal Processing, CISP '08. Congress on, May 27, 2008, IEEE, pp. 265-269.

International Search Report, dated Oct. 21, 2010, in PCT/SE2010/050634.

* cited by examiner

REDUCTION OF NOISE CAUSED BY ABSORPTION OF X-RAY PHOTONS IN PIXELATED IMAGE SENSORS

TECHNICAL FIELD

The invention generally relates to x-ray imaging, and more particularly to situations where a scintillator and a pixelated image sensor are used in combination to capture an x-ray image.

BACKGROUND

It is common practice to use a scintillator in combination with an image sensor to capture x-ray images. In such a setup, the image sensor is placed behind the scintillator. However, by laws of nature, the scintillator can only absorb a certain fraction of all x-ray photons that enter the scintillator's surface. As a consequence, a number of non-absorbed x-ray photons penetrate through the scintillator and continue onto the image sensor. Some of these x-ray photons are absorbed in the image sensor, which typically results in high noise affecting one or several pixels in the neighborhood of the location where the x-ray photon was absorbed.

It is a general requirement in x-ray imaging to achieve the best possible image quality, often interpreted as the balance between high resolution (sharpness) and low noise. These two image requirements are typically contradictory so that high resolution often is accompanied by high noise and vice versa. The noise generated by absorption of x-ray photons in the image sensor, as explained in the previous paragraph, cannot be easily filtered without degrading the resolution (sharpness) in the image.

Sometimes a fiber optic plate (FOP) made of x-ray-absorbing glass is placed between the scintillator and the image sensor in order to absorb x-ray photons that penetrate through the scintillator, thereby reducing noise. However, this solution is costly and increases the overall thickness and weight of the system, which is many times undesired.

SUMMARY

The present invention overcomes these and other drawbacks of the prior art.

It is a general object to provide an improved image quality by reducing the noise generated by the absorption of x-ray photons in the image sensor.

In particular it is desirable to maintain the resolution (sharpness) in the image while reducing the noise generated by the absorption of x-ray photons in the image sensor.

In a first aspect, there is provided a method for reducing noise generated by absorption of x-ray photons in an image sensor having a number of pixels. The method is based on identifying so-called hot pixels affected by absorption of x-rays, and calculating, for each hot pixel, directional gradients in a number of different directions in a pixel neighborhood of the hot pixel. The method further involves selecting, for each hot pixel, at least one direction among those directions having lowest gradients, and determining, for each hot pixel, a replacement value based on neighborhood pixel values in the selected direction(s). For each hot pixel, the value of the hot pixel is then replaced with the determined replacement value.

In this way, noise generated by the absorption of x-ray photons in the image sensor may be reduced, while substantially maintaining the resolution (sharpness) in the image.

In a second aspect, there is provided a device for reducing noise generated by absorption of x-ray photons in an image sensor having a number of pixels. The device is configured to identify so-called hot pixels affected by absorption of x-rays, and configured to calculate, for each hot pixel, directional gradients in a number of different directions in a pixel neighborhood of the hot pixel. Further, the device is configured to select, for each hot pixel, at least one direction other than the direction(s) having highest gradient, and configured to determine, for each hot pixel, a replacement value based on neighborhood pixel values in the selected direction(s). The device is also configured to replace, for each hot pixel, the value of the hot pixel with the determined replacement value.

There is also provided an x-ray sensor system comprising such a device for reducing noise, as well as an x-ray imaging system comprising a scintillator arranged in combination with an image sensor, and a device for reducing noise.

Basically, the invention offers the following advantages: The ability to capture x-ray images of high resolution and low noise with a small and light-weight x-ray sensor system.

The invention is particularly useful in the following technical applications: Dental x-ray, industrial x-ray applications, and scientific x-ray applications.

Other advantages of the invention will be appreciated when reading the below detailed description.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

The invention will now be described with reference to some exemplary and non-limiting embodiments.

Figure 1A:
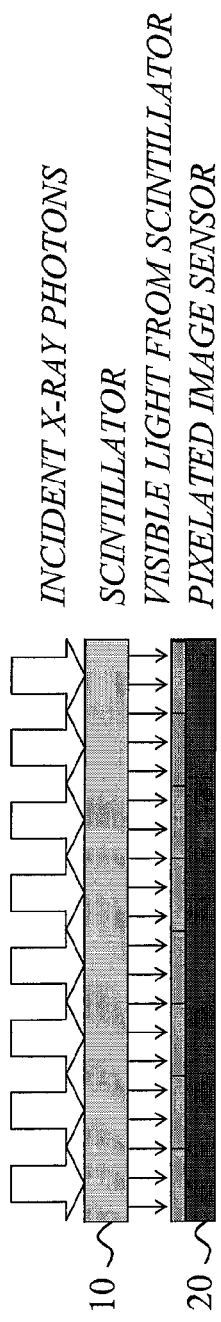
FIGS. 1A-B illustrate a cross section of a scintillator and an image sensor with pixels, showing the wanted function (FIG. 1A) and the unwanted process generating noise (FIG. 1B).
Figure 1B:
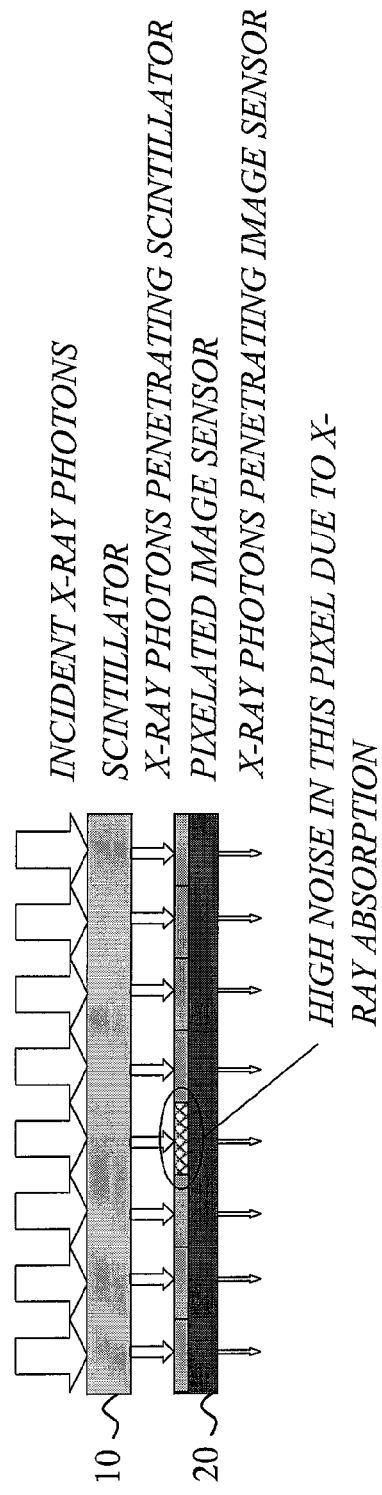

FIGS. 1A-B illustrate a scintillator and an image sensor in a typical configuration for x-ray imaging. FIG. 1A illustrates the wanted function of the configuration with x-ray absorption and light emission in the scintillator 10, and absorption of visible light in the image sensor 20. FIG. 1B illustrates the unwanted process of the configuration with x-ray photons penetrating the scintillator 10 and being absorbed in the image sensor 20. The desired function of this setup is shown in FIG. 1A: The scintillator absorbs x-ray photons and, for each such x-ray photon, emits a burst of photons in the visible range, thus generating a light image that can be captured by a light-sensitive image sensor such as a charge-coupled device (CCD) or CMOS imaging sensor (CIS). However, a scintillator can only absorb a certain fraction of x-ray photons that enter the scintillator's surface. As a consequence, as shown in FIG. 1B, a number of non-absorbed x-ray photons penetrate through the scintillator and continue onto the image sensor. Some of these x-ray photons are absorbed in the image sensor, which typically results in high noise affecting one or several pixels in the neighborhood of the location where the x-ray photon was absorbed.

A basic idea is to apply a novel noise-reduction filter or algorithm which reduces the noise generated by the absorption of x-ray photons in the image sensor, while substantially maintaining the resolution (sharpness) in the image.

The various aspect of the invention covers both a method and a device for noise-reduction.

Figure 2:
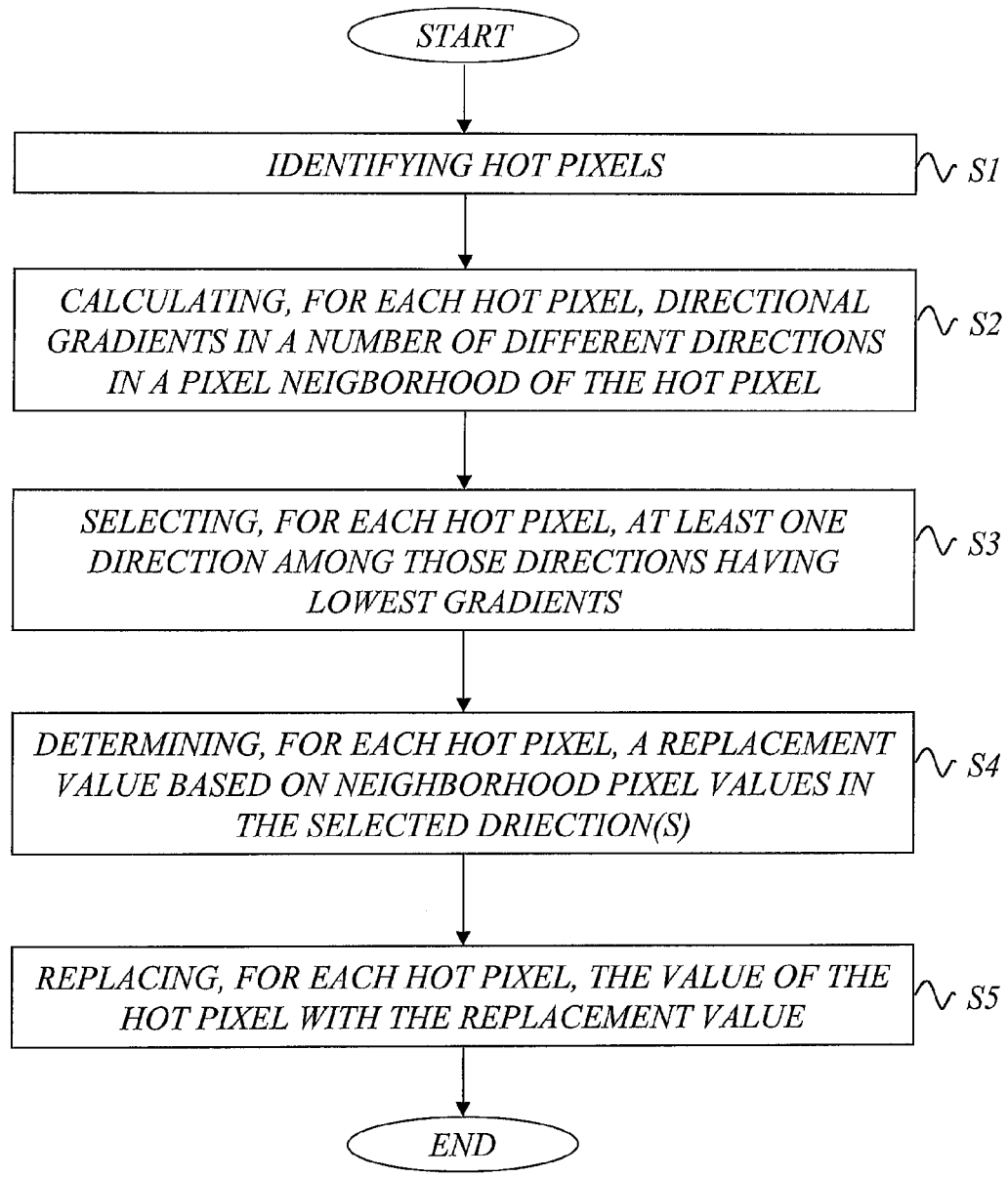
FIG. 2 is a schematic flow diagram illustrating an exemplary method for reducing noise generated by absorption of x-ray photons in an image sensor having a number of pixels.

FIG. 2 is a schematic flow diagram illustrating an exemplary method for reducing noise generated by absorption of x-ray photons in an image sensor having a number of pixels. Step S1 includes identifying so-called hot pixels affected by absorption of x-rays. Step S2 includes calculating, for each hot pixel, directional gradients in a number of different directions in a pixel neighborhood of the hot pixel. Step S3 includes selecting, for each hot pixel, at least one direction among those directions having lowest gradients. Step S4 includes determining, for each hot pixel, a replacement value based on neighborhood pixel values in the selected direction(s). Step S5 includes replacing, for each hot pixel, the value of the hot pixel with the determined replacement value.

In this way, noise generated by the absorption of x-ray photons in the image sensor may be reduced, while substantially maintaining the resolution (sharpness) in the image.

For example, step S1 may include identification of a pixel as a hot pixel if its value deviates from a representative aggregate value derived from neighborhood pixels by a predetermined degree. In a particular example, a pixel is identified as a hot pixel if its value exceeds its neighborhood average above a limit determined by expected statistical fluctuations.

For example, step S2 may include calculation, for each direction, of a gradient based on neighborhood pixel values in the considered direction.

For example, step S3 may include selection of a direction having the lowest gradient, and step S4 then includes determination of a replacement value based on neighborhood pixel values in the direction with the lowest gradient.

Figure 3:
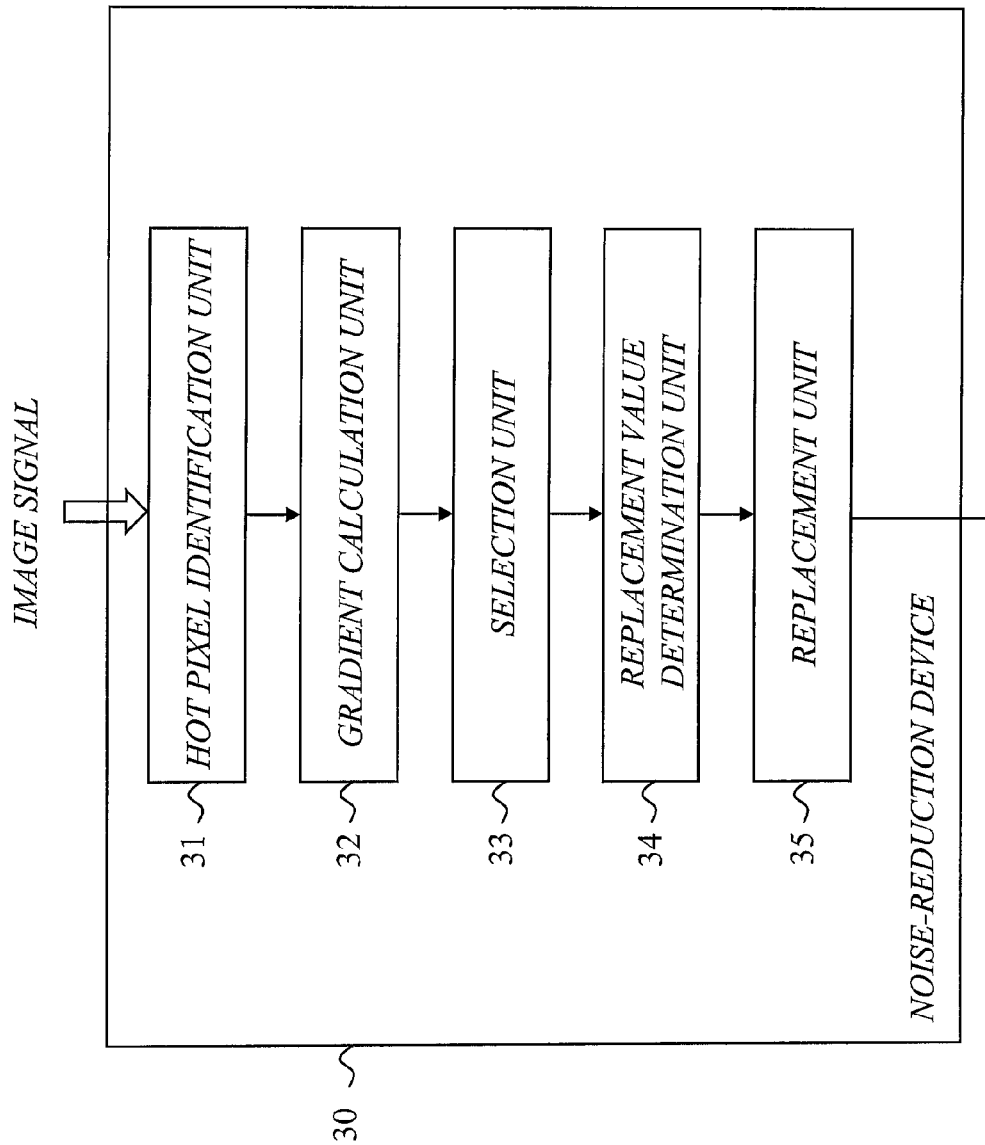
FIG. 3 is a schematic block diagram illustrating an example of a noise-reduction device.

FIG. 3 is a schematic block diagram illustrating an example of a noise-reduction device. The noise reduction device 30 is adapted for reducing noise generated by absorption of x-ray photons in the image sensor.

Basically, the noise-reduction device 30 includes a hot pixel identification unit 31, a gradient calculation unit 32, a selection unit 33, a replacement value determination unit 34, and a replacement unit 35.

The device 30 is configured to identify so-called hot pixels affected by absorption of x-rays, and configured to calculate, for each hot pixel, directional gradients in a number of different directions in a pixel neighborhood of the hot pixel. Further, the device 30 is configured to select, for each hot pixel, at least one direction other than the direction(s) having highest gradient, and configured to determine, for each hot pixel, a replacement value based on neighborhood pixel values in the selected direction(s). The device 30 is also configured to replace, for each hot pixel, the value of the hot pixel with the determined replacement value.

It is thus beneficial to exclude at least the direction(s) having highest gradient, and process the pixel values in one or more of the remaining directions to determine a suitable replacement value for a hot pixel.

In other words, it may be desirable to select at least one direction among those directions having lowest gradients and determine a replacement value based on neighborhood pixel values in the selected direction(s).

For example, the device 30 may be configured to calculate, for each direction, a gradient based on neighborhood pixel values in the considered direction.

By way of example, the device 30 may be configured to identify a pixel as a hot pixel if its value deviates from a representative aggregate value derived from neighborhood pixels by a predetermined degree. In a particular example, a pixel is identified by the device 30 as a hot pixel if its value exceeds its neighborhood average above a limit determined by expected statistical fluctuations.

For example, the device 30 may configured to select a direction having the lowest gradient, and configured to determine a replacement value based on neighborhood pixel values in the direction with the lowest gradient.

The noise-reduction device 30 is preferably implemented as a noise-reduction filter. The filter may for example be implemented as a noise-reduction software algorithm for execution by a suitable processing device, or alternatively the noise-reduction algorithm is implemented in hardware.

The invention produces results similar to those achieved with a fiber optic plate (FOP) and can therefore be thought of as a "Soft-FOP" when implemented in software for execution by processing hardware.

Figure 4:
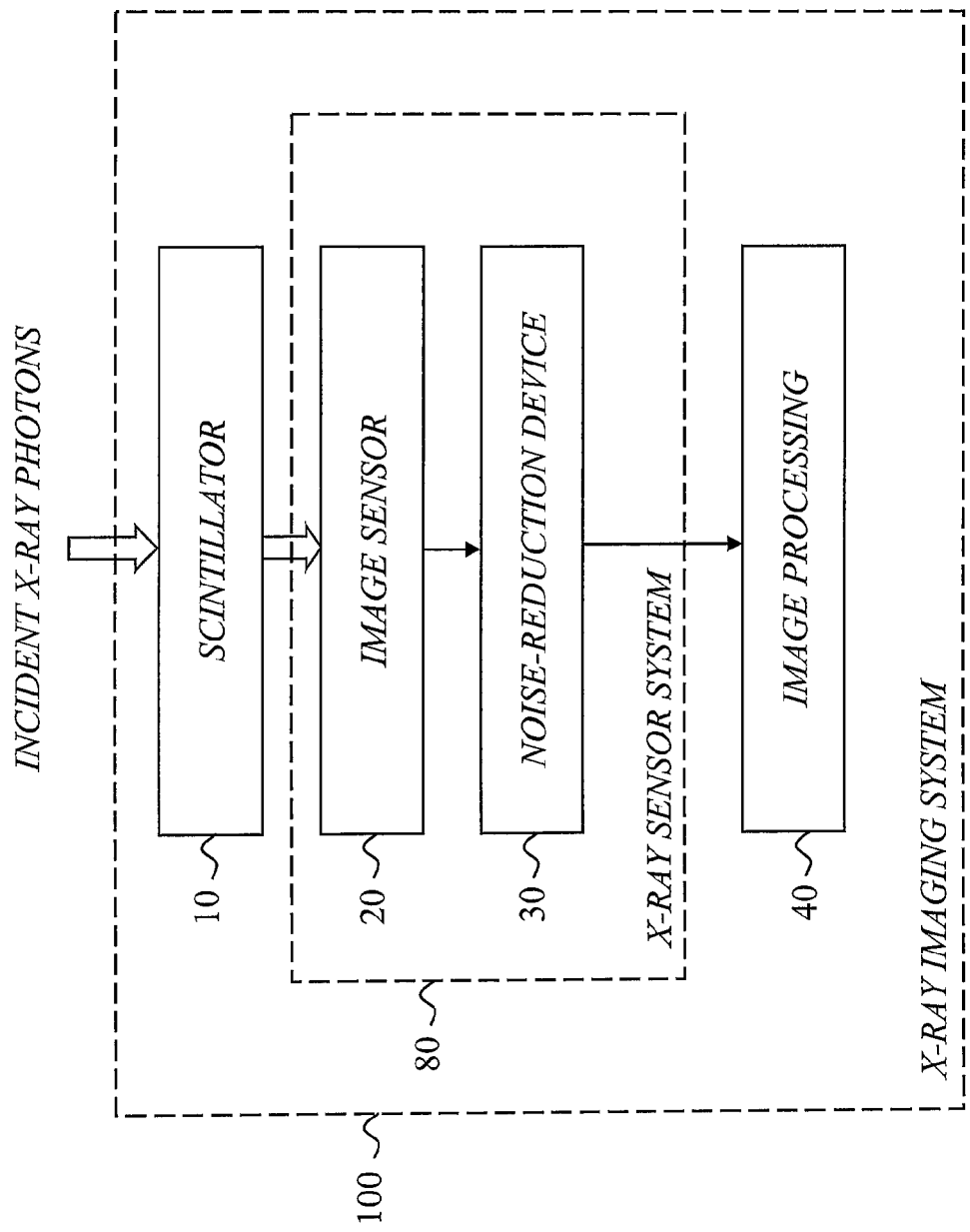
FIG. 4 is a schematic block diagram illustrating an example of an overall x-ray imaging system.

FIG. 4 is a schematic block diagram illustrating an example of an overall x-ray imaging system 100 comprising a scintillator 10, an image sensor 20 having a number of pixels, and a noise-reduction device 30. The overall x-ray imaging system 100 typically also includes an image processing unit 40 for producing useful x-ray images.

The image sensor 20 and the noise reduction device 30 may be regarded as an x-ray sensor system 80.

Alternatively, the noise-reduction device 30 may be implemented as part of the image processing unit 40.

The invention thus also provides an x-ray sensor system as well as an x-ray imaging system based on a scintillator, an image sensor and a novel noise-reduction filter/device.

In other words, the invention at least partly relates to a filter or algorithm for reducing the noise generated by the absorption of x-ray photons in the image sensor, while substantially maintaining the resolution (sharpness) in the image. It may thus be possible to replace the conventional Fiber Optic Plate by a post-processing filter.

As indicated above, the filter may for example be implemented as a noise-reduction software algorithm for execution by a suitable processing device such as a computer or Digital Signal Processor (DSP), and/or any programmable logic device such as Field Programmable Gate Array (FPGA) and Programmable Logic Controller (PLC) devices. Alternatively the filter algorithm may be implemented in hardware, for example by using Application Specific Integrated Circuit (ASIC) technology.

Preferably, the filter implements so-called gradient-based hot-pixel filtering, as described above.

The resolution (sharpness) may be interpreted as the modulation transfer function (MTF), and the post-processing noise-reduction filter may thus be regarded as an MTF-preserving filter.

Figure 5:
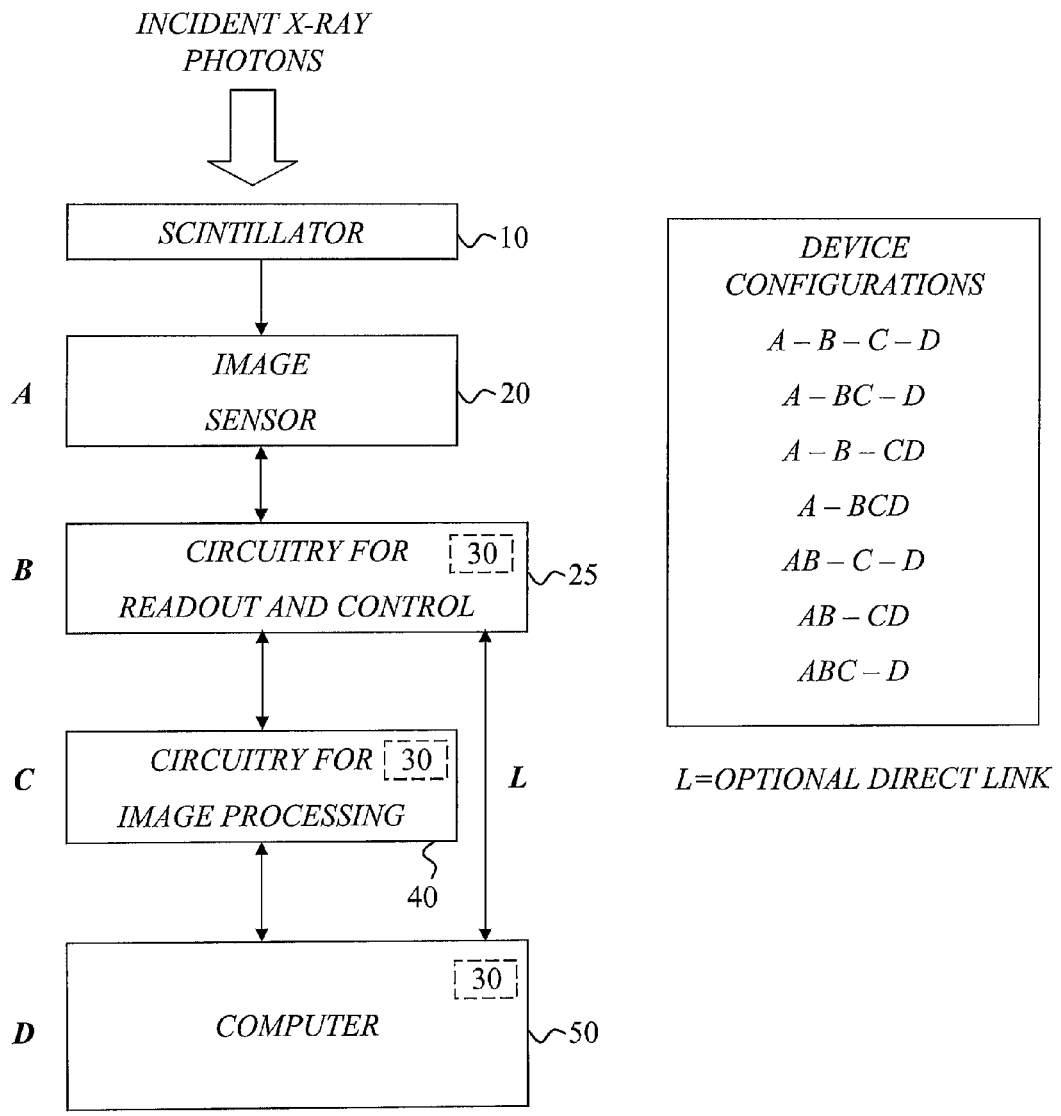
FIG. 5 is an exemplary block diagram of a typical setup, including a scintillator, image sensor (A), circuitry for readout and control (B), circuitry for image processing (C) and a computer (D). Possible device configurations are shown to the right, where hyphen ("-") denotes separation between devices.

FIG. 5 is an exemplary block diagram of a typical setup, including a scintillator 10, an image sensor 20 (A), circuitry 25 for readout and control (B), circuitry 40 for image processing (C) and a computer 50 (D). Possible device configurations are shown to the right, where hyphen ("-") denotes separation between devices. As indicated there exist a wide variety of different possible device configurations.

The image sensor 20 is preferably a pixelated image sensor having a number of pixels.

The noise-reduction device 30 of the invention may for example be implemented in any of circuitry 25, 40, 50 (B, C and D), either as a software module for execution by a processing device such as the computer 50 (D) or as a hardware circuit. It should also be understood that circuitry 20 and 25 (A and B) may be integrated. Alternatively, circuitry 25 and 40 (B and C) may be integrated, or all of circuitry 20, 25 and 40 (A, B and C) may be integrated. It is also possible to integrate circuitry 25 and/or 40 (B and/or C) in the computer 50 (D). The direct link "L" between circuitry 25 (B) and circuitry 50 (D) is optional. In FIG. 5, bi-directional arrows indicate bi- or unidirectional communication.

Figure 6:
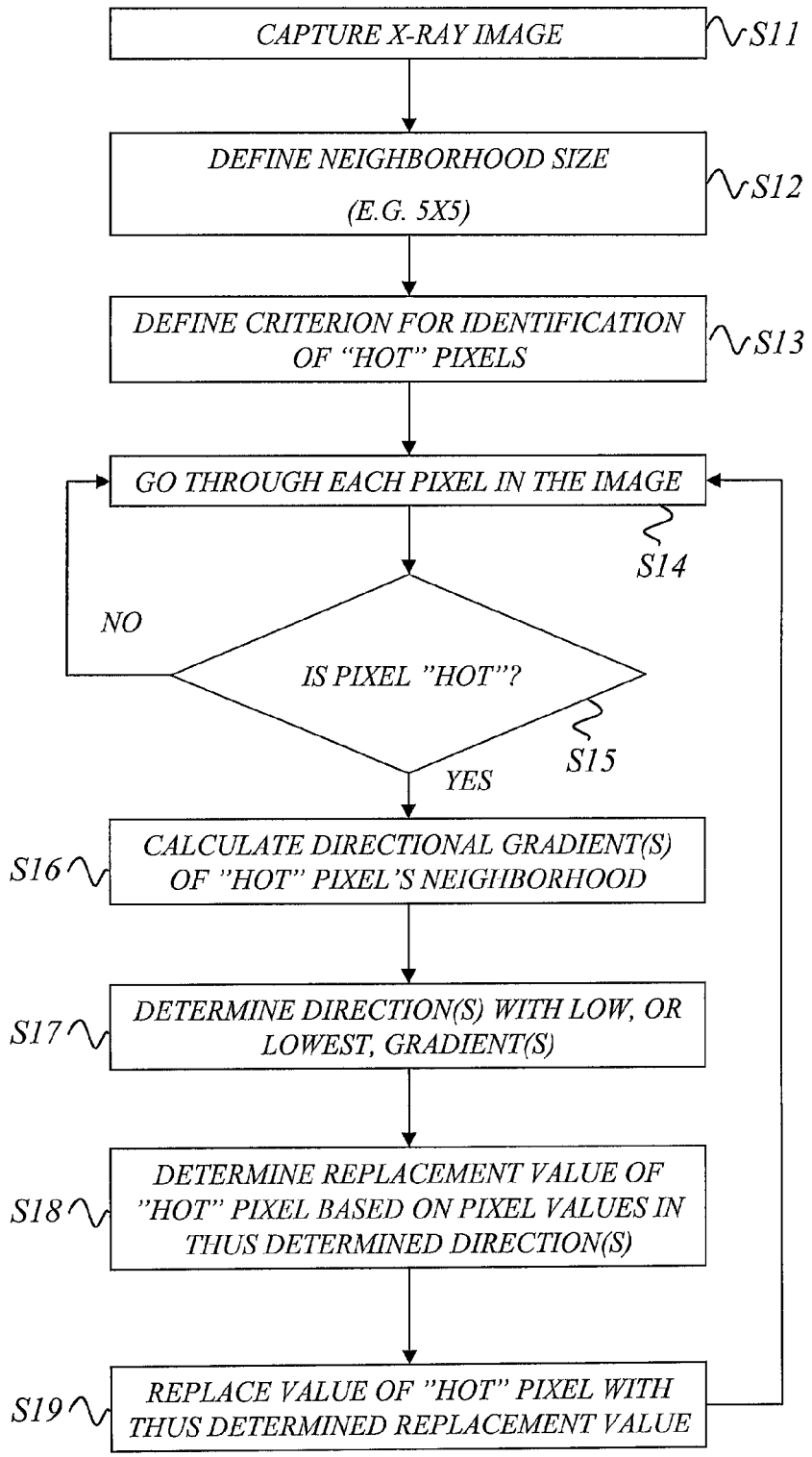
FIG. 6 is an exemplary flow chart showing the process of defining neighborhood size, defining "hot" pixel criterion, identification of "hot" pixels, calculation of directional gradient(s), determination of direction(s) with low, or lowest, gradient(s), and determination of the "hot" pixel's replacement value.

FIG. 6 is an exemplary flow chart showing the process of defining neighborhood size, defining "hot" pixel criterion, identification of "hot" pixels, calculation of directional gradient(s), determination of direction(s) with low, or lowest, gradient(s), and determination of the "hot" pixel's replacement value.

In the particular example of FIG. 6, step S11 includes capturing of an x-ray image. Step S12 includes defining a desired neighborhood size (e.g. 5×5). Step S13 includes defining a criterion for identification of "hot" pixels. Step S14 includes going through each pixel in the image. In step S15, it is investigated whether or not the pixel is hot. If not (NO), the next pixel is checked. If the pixel is hot (YES), the method continues with steps S16-S19. Step S16 includes calculating directional gradient(s) of "hot" pixel's neighborhood. Step S17 includes determining direction(s) with low or lowest gradient(s). Step S18 includes determining a replacement value of the "hot" pixel based on pixel values in the thus determined direction(s). Step S19 includes replacing the value of the "hot" pixel with the thus determined replacement value.

A reduced neighborhood size can be used for pixels closest to the edge of the image.

FIGS. 7 to 10 illustrate an example with a neighborhood of size 5×5 pixels and a sharp object covering the two rightmost columns.

Figure 7:
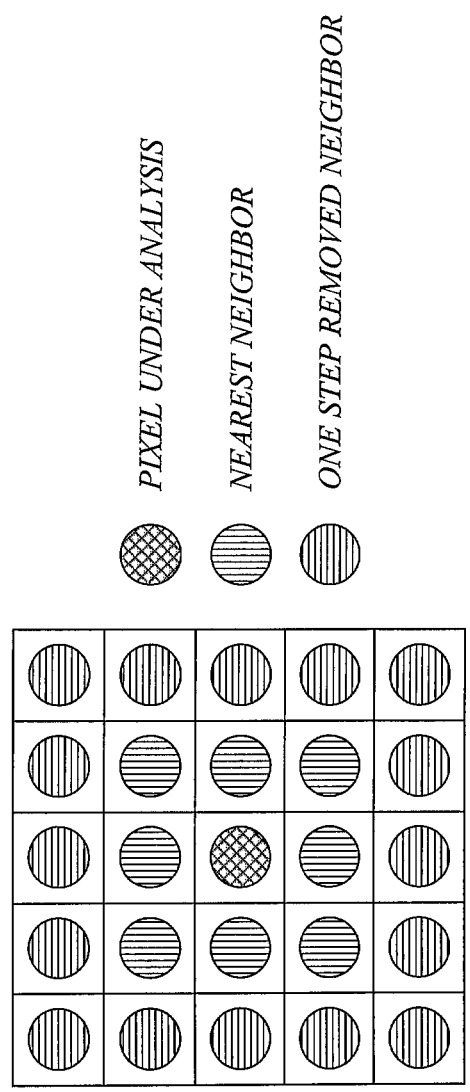
FIG. 7 is a top view of a pixel neighborhood in which the center pixel is being analyzed and compared with its neighbors (nearest and one step removed).

FIG. 7 is a top view of a pixel neighborhood in which the center pixel is being analyzed and compared with its neighbors (nearest and one step removed).

Figure 8:
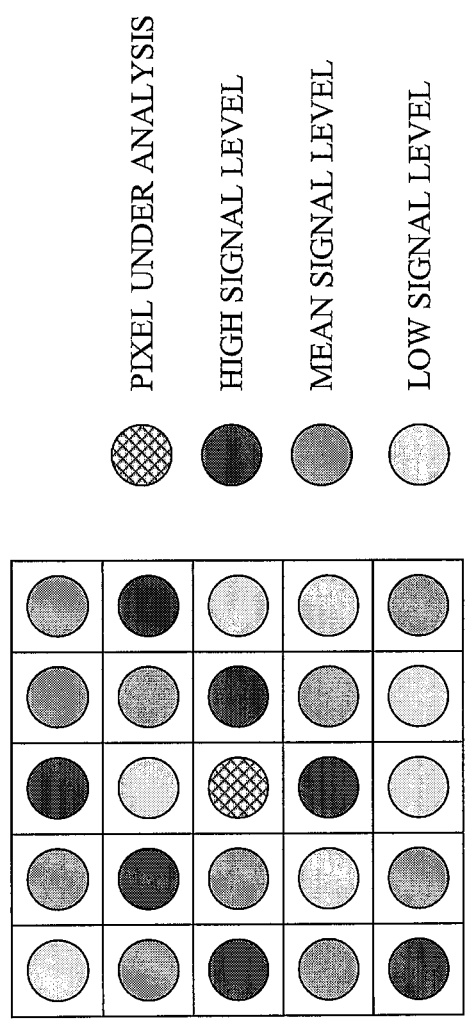
FIG. 8 is a top view of a pixel neighborhood. The different patterns/gray levels of the pixels in the neighborhood illustrate a typical situation with a variation in signal level between pixels due to statistical fluctuations.

FIG. 8 is a top view of a pixel neighborhood. The different patterns/gray levels of the pixels in the neighborhood illustrate a typical situation with a variation in signal between pixels due to statistical fluctuations. The center pixel is determined to be "hot", indicating an absorption of an x-ray photon in (or near) this pixel, if its value exceeds its neighborhood above a limit determined by expected statistical fluctuations. If, by this process, the center pixel is determined to be "hot", its value will be replaced by a calculation based on the pixel values in the neighborhood. In the following, the center pixel in this example is assumed to be "hot"

Figure 9:
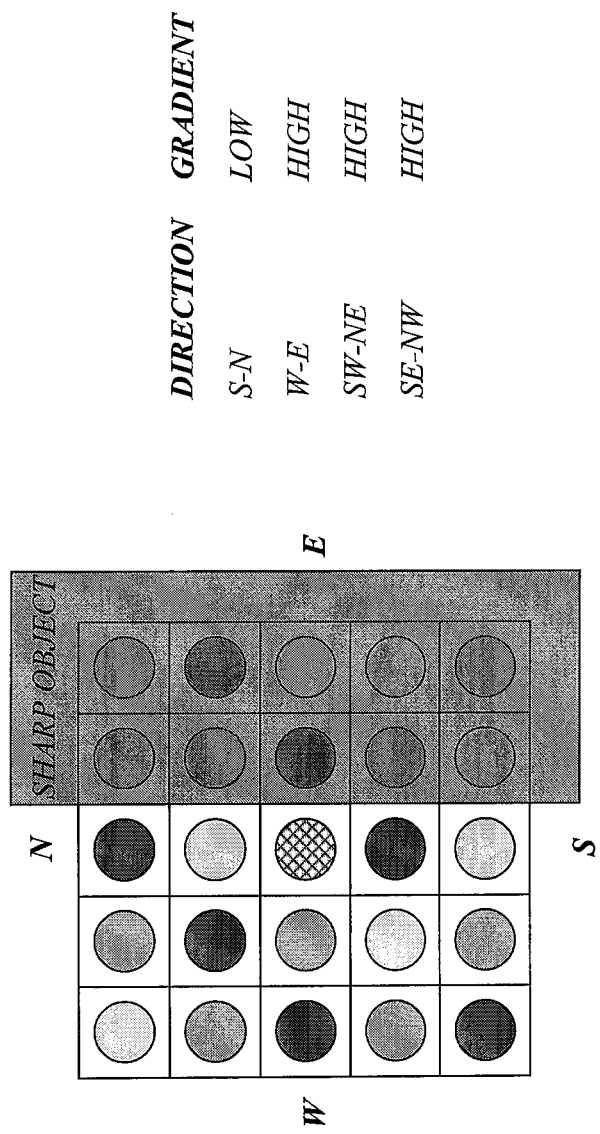
FIG. 9 is a top view of the same pixel neighborhood. A sharp object with partial x-ray absorption (e.g. a tooth) covers the two rightmost pixel columns. The gradient, based on pixel values in the neighborhood, is calculated for each direction. In this example, various compass directions are indicated.

FIG. 9 is a top view of the same pixel neighborhood. A sharp object with partial x-ray absorption (e.g. a tooth) covers the two rightmost pixel columns. The gradient in each direction is calculated based on pixel values in the neighborhood. In this example, fundamental compass directions (N, S, W, E) are indicated. Naturally, diagonal directions may also be considered, as illustrated (SW-NE, SE-NW). Replacement value for the center pixel is calculated based on neighborhood values in direction(s) other than the direction(s) of highest gradient. By doing so, blurring of a sharp edges and fine objects can be avoided, thus reducing noise while maintaining the resolution (sharpness) in the image.

Figure 10:
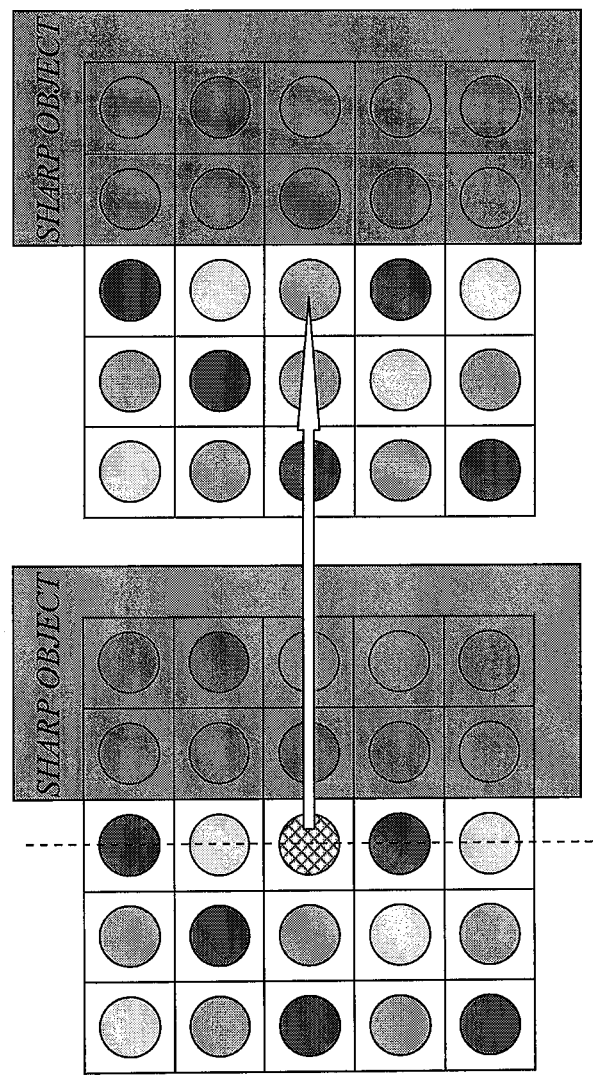
FIG. 10 is a top view of the same pixel neighborhood. Replacement value for the center pixel is calculated based on neighborhood values in direction(s) of low or lowest, gradient.

FIG. 10 is a top view of the same pixel neighborhood. In this example, the replacement value for the center pixel is calculated based on neighborhood values in direction(s) of low or lowest gradient.

The example of FIG. 10 illustrates the center pixel before (left) and after (right) replacement of pixel value. In this example the replacement value is determined by the neighborhood pixel values in S-N direction (direction of lowest gradient).

The steps described above are typically repeated for each pixel in the image.

Naturally, the size of the considered neighborhood may differ from the illustrated 5×5 neighborhood; both smaller and larger neighborhood areas may be considered. Also, a reduced neighborhood size can be used for pixels closest to the edge of the image.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

The invention claimed is:

1. A method for reducing noise generated by absorption of x-ray photons in an image sensor having a number of pixels, wherein said method comprises the steps of:
    identifying (S1; S15) so-called hot pixels affected by absorption of x-rays,
    calculating (S2; S16), for each hot pixel, directional gradients in a number of different directions in a pixel neighborhood of the hot pixel, the gradient, for each direction, being calculated based on neighborhood pixel values in the considered direction,
    selecting (S3; S17), for each hot pixel, at least one direction among those directions having the lowest gradients,
    determining (S4; S18), for each hot pixel, a replacement value based on neighborhood pixel values in the selected direction(s), and replacing (S5; S19), for each hot pixel, the value of the hot pixel with the determined replacement value.

2. The method of claim 1, wherein said step of calculating (S2; S16), for each hot pixel, directional gradients comprises the step of calculating, for each direction, a gradient based on neighborhood pixel values in the considered direction.

3. The method of claim 1, wherein said step (S1; S15) of identifying hot pixels comprises the step of identifying a pixel as a hot pixel if its value deviates from a representative aggregate value derived from neighborhood pixels by a predetermined degree.

4. The method of claim 3, wherein said step (S1; S15) of identifying hot pixels comprises the step of identifying a pixel as a hot pixel if its value exceeds its neighborhood above a limit determined by expected statistical fluctuations.

5. The method of claim 1, wherein said step (S3; S17) of selecting at least one direction comprises the step of selecting a direction having the lowest gradient, and said step of determining a replacement value comprises the step of determining a replacement value based on neighborhood pixel values in the direction with the lowest gradient.

6. A device (30) for reducing noise generated by absorption of x-ray photons in an image sensor (20) having a number of pixels,
wherein said device (30) is configured to identify so-called hot pixels affected by absorption of x-rays,
configured to calculate, for each hot pixel, directional gradients in a number of different directions in a pixel neighborhood of the hot pixel, the gradient, for each direction, being calculated based on neighborhood pixel values in the considered direction,
configured to select, for each hot pixel, at least one direction other than the direction(s) having the highest gradient,
configured to determine, for each hot pixel, a replacement value based on neighborhood pixel values in the selected direction(s), and
configured to replace, for each hot pixel, the value of the hot pixel with the determined replacement value.

7. The device of claim 6, wherein said device (30) is configured to calculate, for each direction, a gradient based on neighborhood pixel values in the considered direction.

8. The device of claim 6, wherein said device (30) is configured to identify a pixel as a hot pixel if its value deviates from a representative aggregate value derived from neighborhood pixels by a predetermined degree.

9. The device of claim 8, wherein said device (30) is configured to identify a pixel as a hot pixel if its value exceeds its neighborhood above a limit determined by expected statistical fluctuations.

10. The device of claim 6, wherein said device (30) is configured to select a direction having the lowest gradient, and configured to determine a replacement value based on neighborhood pixel values in the direction with the lowest gradient.

11. The device of any of the claims 6-10, wherein said device (30) is configured as a noise-reduction filter.

12. The device of claim 11, wherein said noise-reduction filter is implemented as a noise-reduction software algorithm for execution by a processing device.

13. The device of claim 11, wherein said noise-reduction filter is implemented in hardware.

14. An x-ray sensor system (80) comprising a device (30) of any of the claims 6-13.

15. An x-ray imaging system (100) comprising a scintillator (10) arranged in combination with an image sensor (20), and a device (30) of any of the claims 6-13.

* * * * *